March 21, 1933. F. L. FULLER 1,902,066
COMPUTING SCALE
Filed March 5, 1930 10 Sheets-Sheet 4

Inventor
Frederick L. Fuller
By his Attorney
W. M. Wilson

March 21, 1933. F. L. FULLER 1,902,066
COMPUTING SCALE
Filed March 5, 1930 10 Sheets-Sheet 5
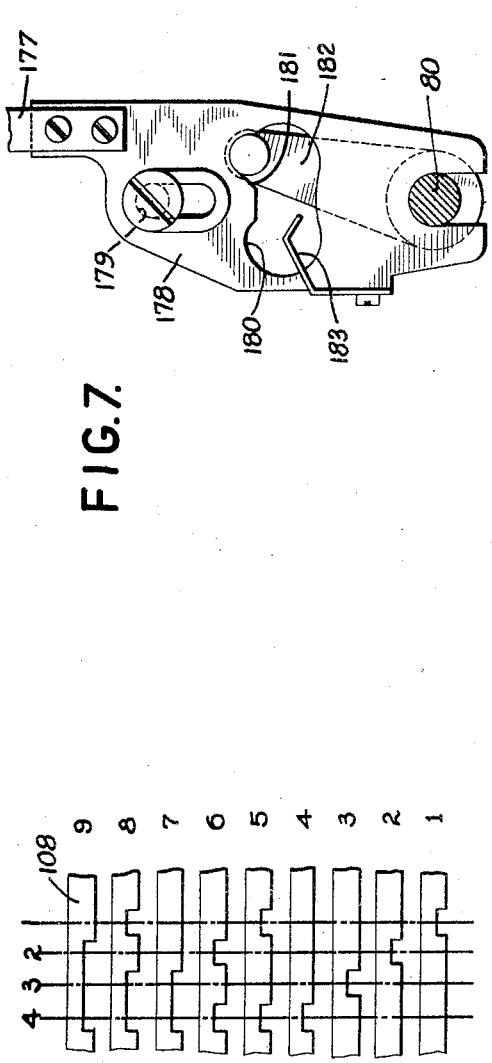
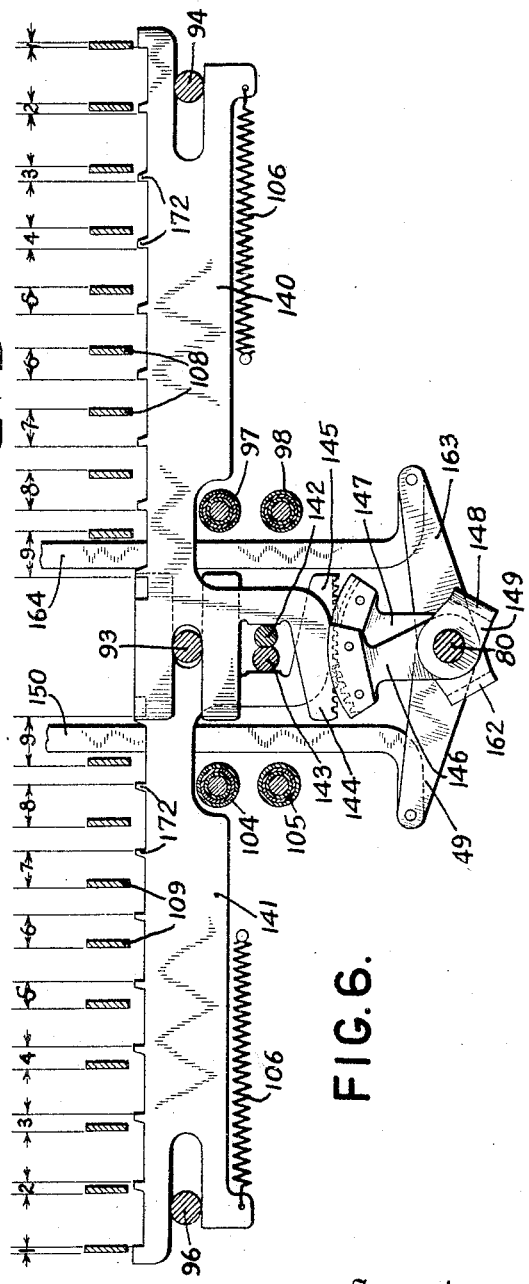
Inventor
Frederick L. Fuller
By his Attorney

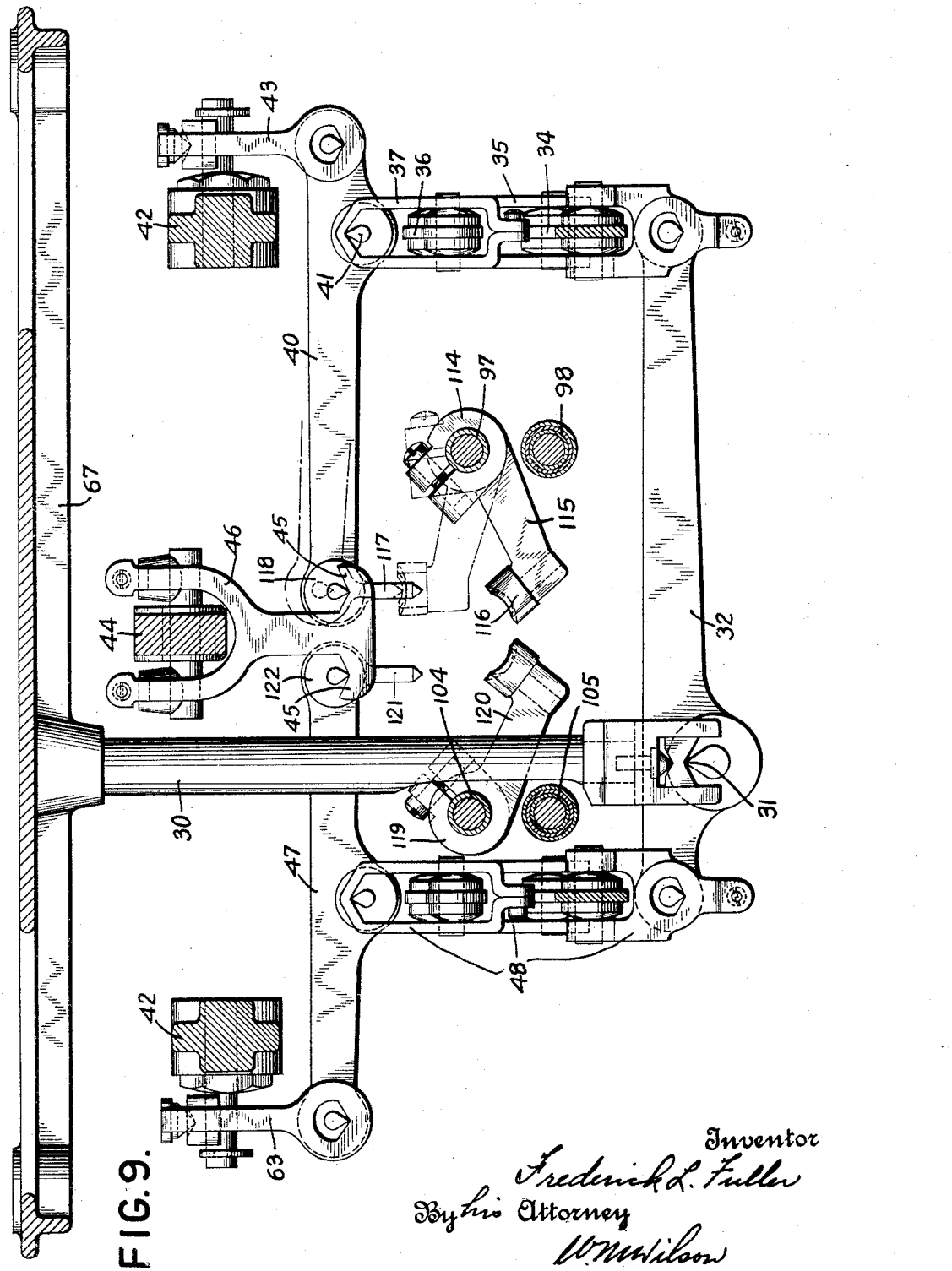

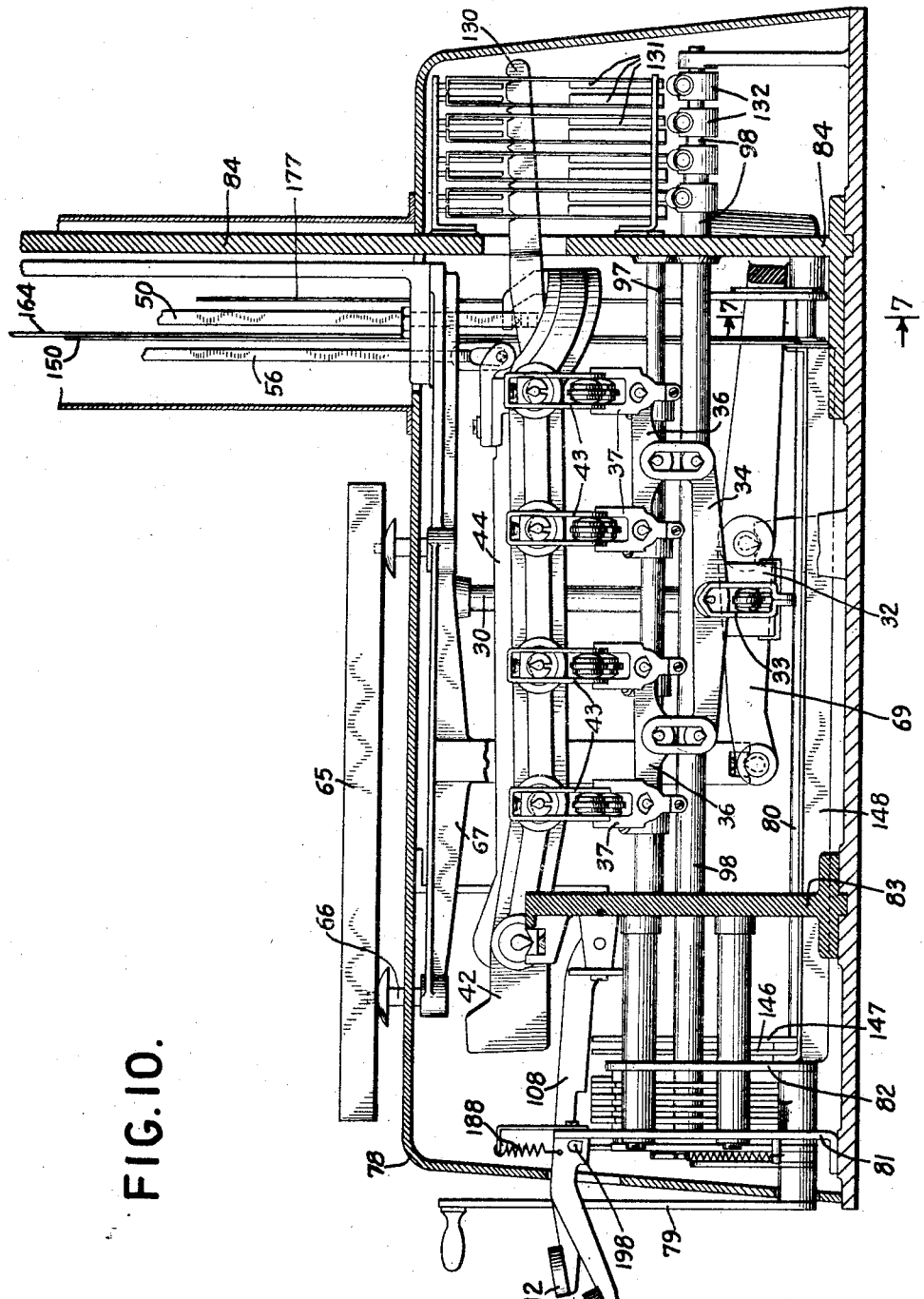

March 21, 1933.  F. L. FULLER  1,902,066
COMPUTING SCALE
Filed March 5, 1930    10 Sheets-Sheet 8

FIG. 11.

Inventor
Frederick L. Fuller
By his Attorney
WM Wilson

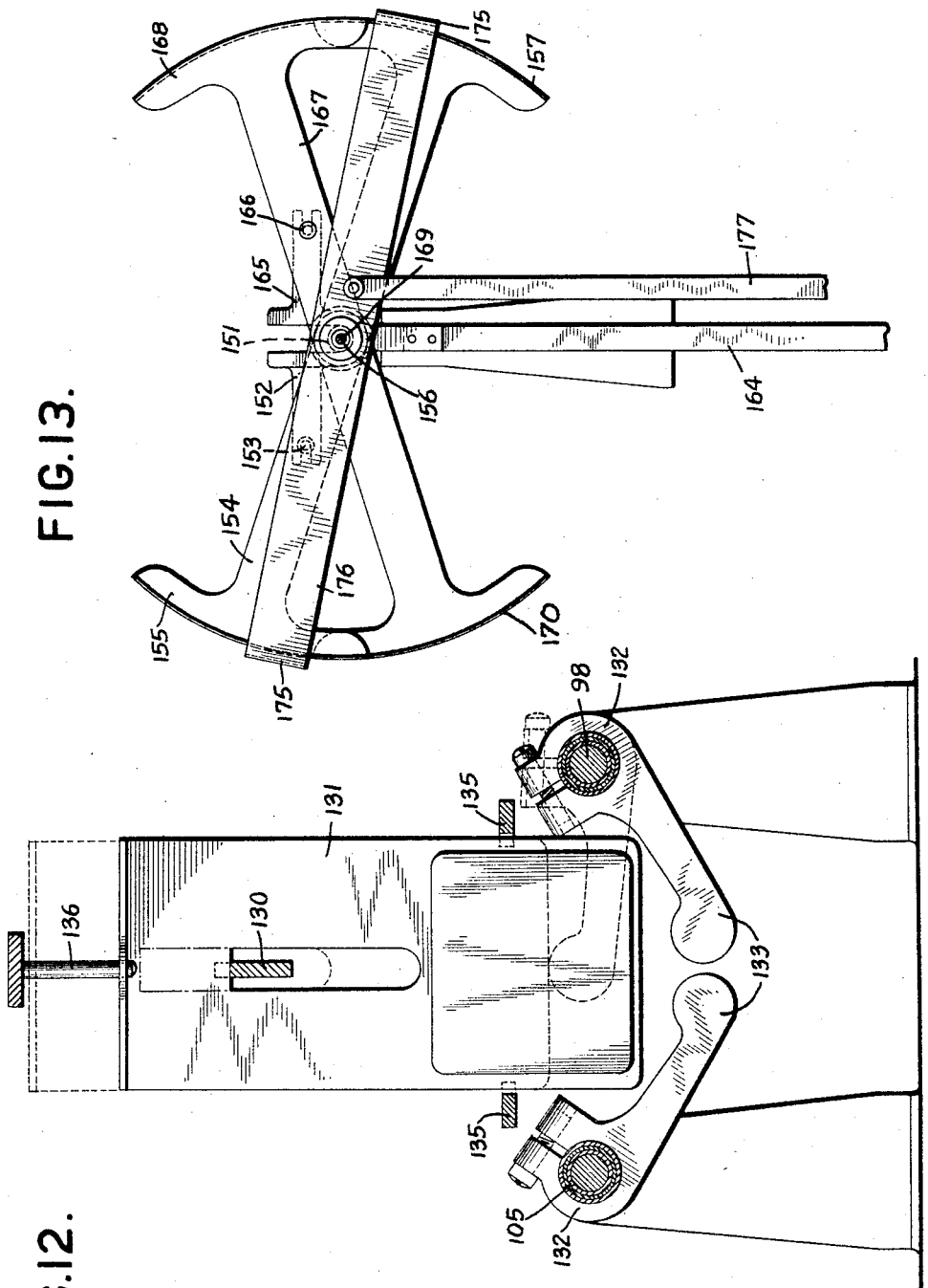

Patented Mar. 21, 1933

1,902,066

UNITED STATES PATENT OFFICE

FREDERICK L. FULLER, OF WEST ORANGE, NEW JERSEY, ASSIGNOR TO DAYTON SCALE COMPANY, OF DAYTON, OHIO, A CORPORATION OF NEW JERSEY

COMPUTING SCALE

Application filed March 5, 1930. Serial No. 433,440.

This case relates to weighing and computing scales and particularly to one in which a computing chart is variously operated in accordance with different, selected factors of the weight.

The object of this invention in general is to provide novel and improved mechanism for selecting the factors in accordance with which the computing chart is to be operated. More specifically in connection with factor levers which associate the computing chart with the load support, it is an object to provide rotatably mounted, rockable, nested members for controlling the factor levers.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 6 is a section on line 6—6 of Fig. 3.

Fig. 7 is a detail of a shutter operating means.

Fig. 8 shows the arrangement of selecting notches in the selecting combs for differentially controlling the operation of the factor levers.

Fig. 9 is a section on line 9—9 of Fig. 3.

Fig. 10 is a section on line 10—10 of Fig. 3.

Fig. 11 is a section on line 11—11 of Fig. 3.

Fig. 12 is a section on line 12—12 of Fig. 3.

Fig. 13 is a side view of the price per pound indicating charts and the shutter therefor.

Before proceeding with the detailed disclosure in connection with the figures of the drawings, the general plan of operation of the scale will be briefly described. The scale is designed to indicate weights in combination with the price of the commodity which is being weighed and provision is also made to indicate the price per unit weight of the commodity. A weighing chart and a total price chart are therefore provided which are operated by different scale beams hereinafter referred to as the weight beam and the price beam respectively. The load receiving platform or receptacle is operatively connected to load offsetting pendulums as is usual in scales of this type. A weighing load on the scale is transmitted through a lever system to both the weight beam and the scale beam. This lever system includes a plurality of factor levers each of which is permanently, operatively connected to the load receiving platform or receptacle and to the weight beam so that all the factor levers are effective for every weighing operation. Each of the factor levers is normally disengaged from the price beam but any number or all of them may be operatively associated with it at will. The systems for interconnecting the various factor levers with the platform system have different distinctive operating ratios so that by varying the number of factor levers which are connected to the price beam this beam may be operated in accordance with different predetermined portions of the applied load. The weight beam and the price beam are each provided with individual load offsetting pendulums so that their load offsetting operations are entirely independent of each other except in so far as they are operated by the common factor levers. It will be understood then that every factor lever in the system is always operative so far as the weight beam is concerned while any number of them may be made operative with regard to the price beam.

Figure 14:
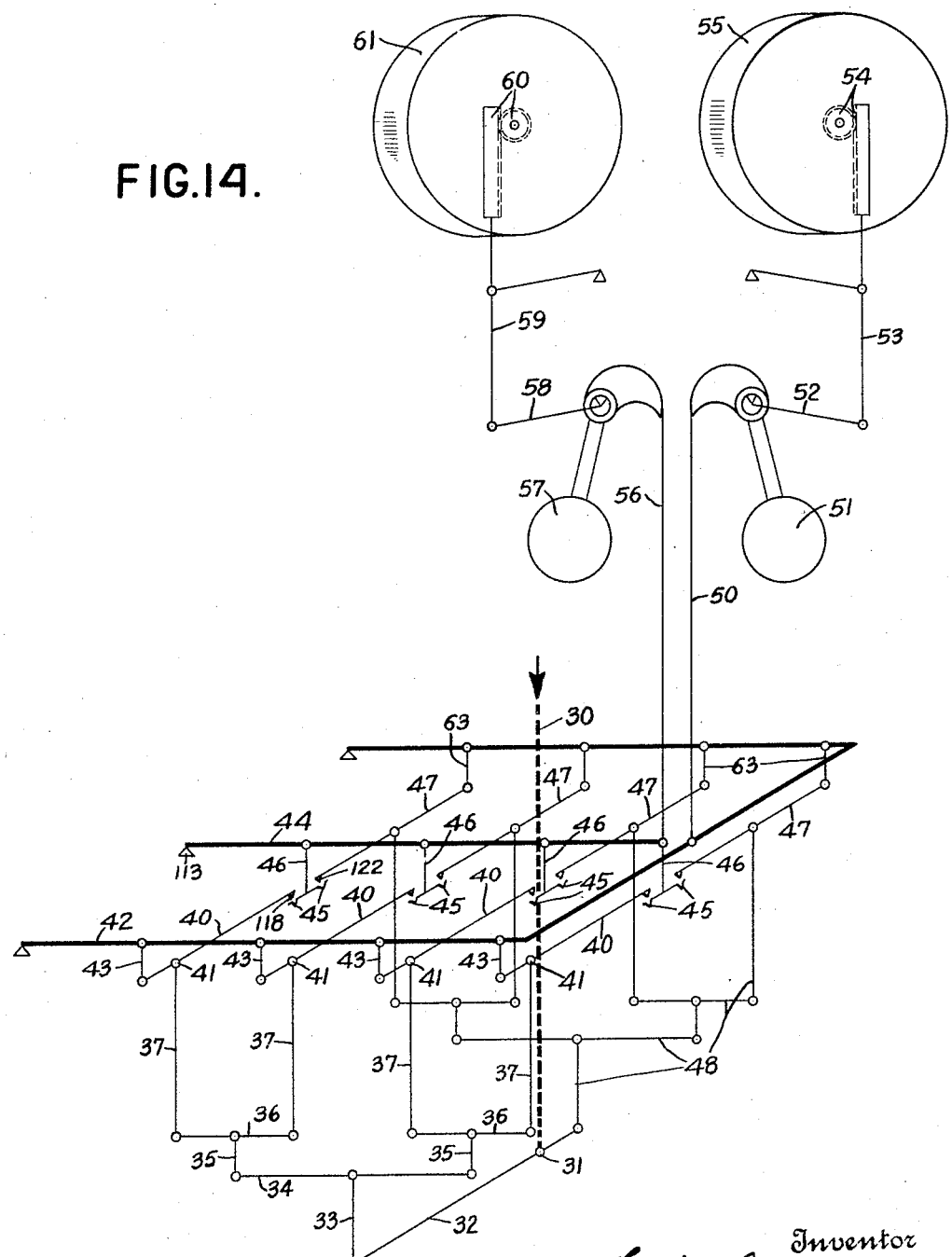
Fig. 14 is a schematic showing of the scale.

The schematic arrangement of the factor levers and other levers of the scale will be more clearly understood from Fig. 14 in which the levers and beams are represented diagrammatically in connection with associated load offsetting pendulums and charts. Referring to this figure it may be assumed that a vertical member 30, illustrated in dotted lines, is connected to the platform or load receptacle so that it will be forced downward when a load is placed thereon. This member 30 at its lower end is pivoted at 31 to a lever 32, the pivot point 31 in this particular example dividing the lever into two portions in the ratio of one to four. The lever 32 at one end is connected by a link 33 to the middle point of a lever 34 and owing to the ratio of the arm to the lever 32 it will be obvious that one-fifth of the load applied to the member 30 will be transmitted to the lever 34. The latter lever is connected by suitable links 35 to the middle points of levers 36, which in turn are connected at their ends through links 37 to individual factor levers 40, the pivot points on the factor lever being designated at 41. This pivot point divides each of the factor levers in the ratio of one to four. The shorter arm of each of these factor levers is permanently connected to the weight beam 42 by links 43 while the longer arms are normally disconnected from the price beam 44 but each of levers 40 may be individually seated on an adjacent pivot 45 of the stirrup 46 on the lever 44, if desired. The weight beam 42 is of U-shape and factor levers 47 forming an additional set are each connected by the linkage 48 to the end of the short arm of lever 32 in a manner entirely similar to that just described. The linkage 48, however, is connected to the middle point of the factor levers 47.

The weight lever 42 is connected through tape 50 to an offsetting pendulum 51 which through a lever 52 and link 53 and a suitable rack and pinion 54 is connected to a weight chart 55. The price beam 44 through tape 56 is connected to a load offsetting pendulum 57 which through lever 58, link 59 and rack and pinion 60 is connected to a price chart 61.

As each of the factor levers 40 and 47 are permanently connected to the weight beam 42 it is obvious that all the factor levers are operative in the weighing operation and a definite and unchangeable ratio of the weight applied to member 30 will be transmitted to and balanced by pendulum 51. Hence the reading of weight chart 55 is not varied by the factor levers. As the pivots 45, however, can be individually connected to or disconnected from the price beam 44 at will the force applied from member 30 through levers 40 and 47 to price beam 44 for any given weighing load may be varied and the indication of the price chart correspondingly controlled in accordance with different predetermined factors of the load. The ratio of the weight applied to the member 30 to the force transmitted to the price beam 44 may be analyzed by a specific example in which a load of one pound is applied to member 30 and is considered to consist of one hundred units of force. In that case one-fifth or twenty units of the load will be applied to the link 33 and transmitted to the factor levers 40 and four-fifths of the load or 80 units will be applied through the links 48 to the factor levers 47. This results, of course, from the one to four ratio of the arms of lever 32. The twenty units applied to link 33 are divided into four equal parts of five units each by the levers 34 and 36 and one part of five units is transmitted by each link 37 to its attached factor lever 40. Owing to the ratio of the arms of these factor levers the force of five units received by each will be again divided; four units being applied to the weight beam 42 and one unit being effective at pivot 45. The force of 80 units transmitted through the linkage 48 will be ultimately equally distributed to the factor levers 47, each of these four factor levers receiving 20 units of which ten units is transmitted to the weight beam 42 through each link 63 and of which ten units is effective at each adjacent pivot 45. The stirrups 46 on the price beam 44 which carry the pivot bearings for the factor levers are spaced along the price bar 44 at equal progressive distances so that if the factor lever 40 nearest the pivot of the beam is pivoted to its stirrup 46 a force of a definite value which may represent one unit of value, for example one cent per pound is effective in displacing the price pendulum 57 and consequently the price chart 61.

The next factor lever 40, if pivoted on its stirrup 45 will be twice as effective in displacing the price beam and the price chart 55 and consequently would represent a value of two cents per pound. In like manner the other factor levers to the right may represent values of three and four cents per pound respectively. By selectively connecting two or more of the factor levers 40 to the price beam forces corresponding to values up to ten cents will be effective on the price beam.

In a similar manner the factor lever 47 nearest the pivot of price beam 44 may transmit a force to this beam corresponding to ten cents and by different combinations of the factor levers 47 forces corresponding values of ten cents up to the one dollar may be transmitted to the price lever 44. It is obvious then that the total force which may be applied to the price lever represent $1.10 per pound. As these money values are all referred to a weight of one pound placed on the member 30 it is obvious that if more than one pound is placed on the member 30 a reading on the price chart 61 will indicate the total price of the article being weighed at the selected price per pound.

Figure 1:
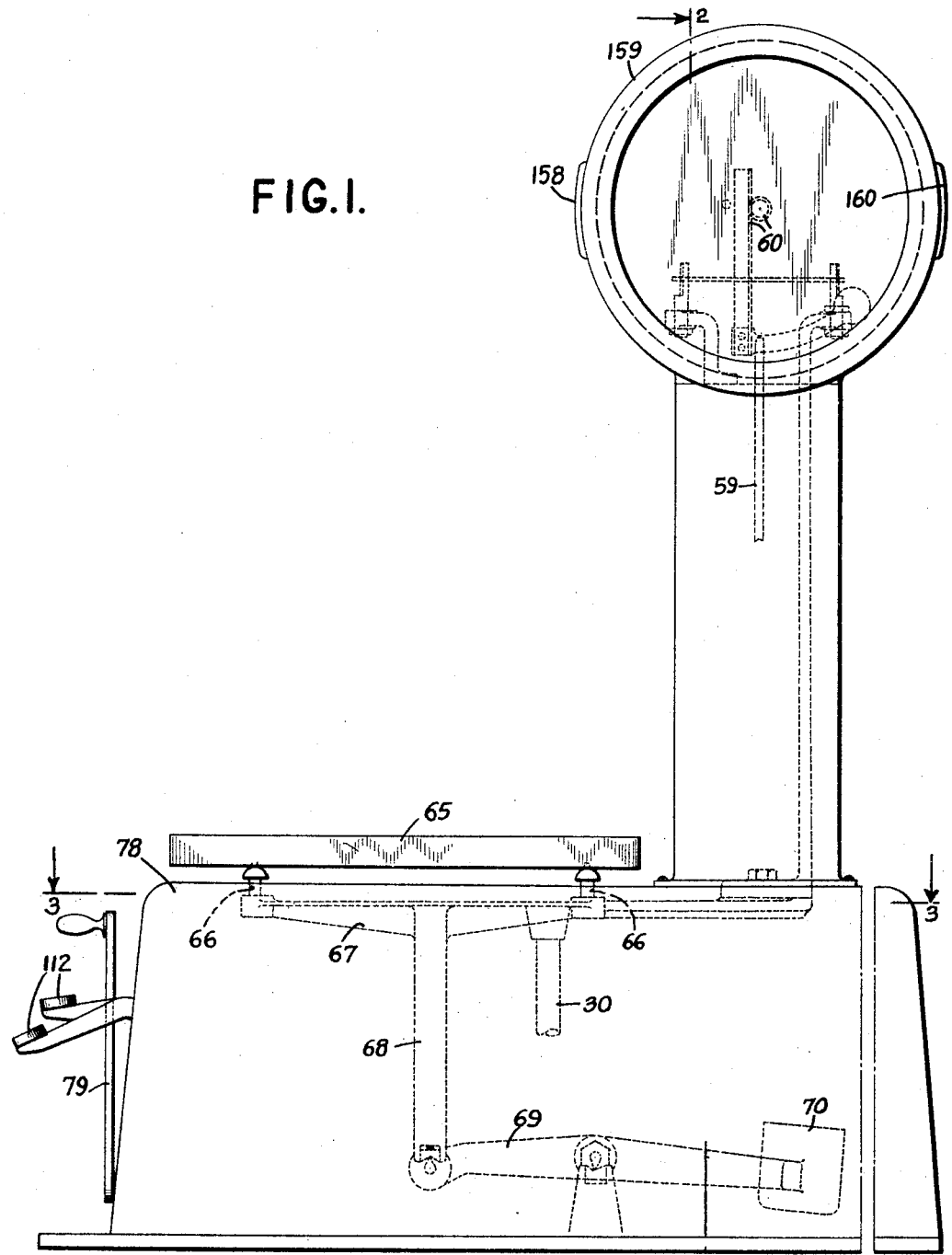
Fig. 1 is a side view of the scale.
Figure 2:
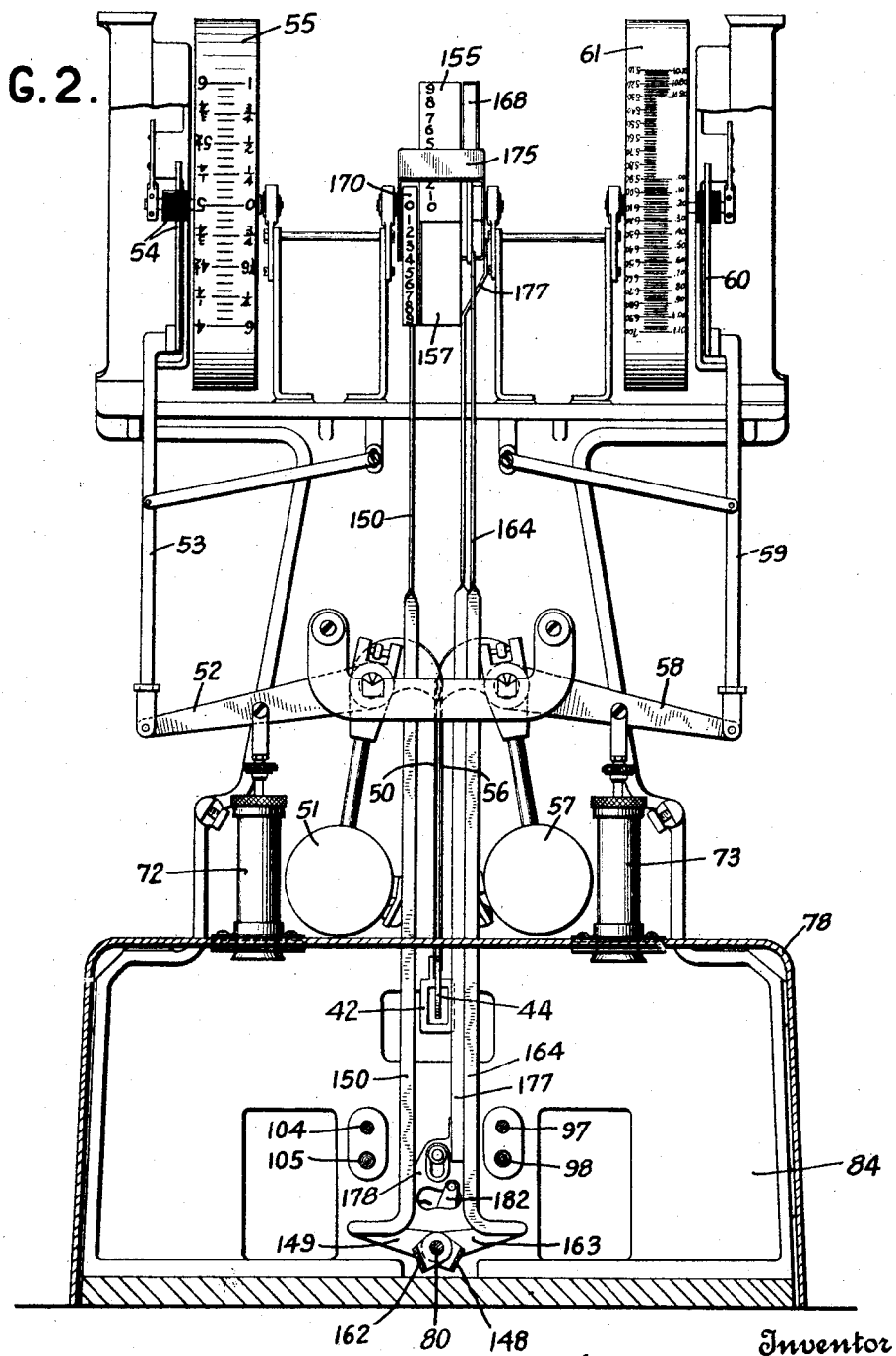
Fig. 2 is a section on line 2—2 of Fig. 1.

The structural details of the scale are indicated generally in Figs. 1 and 2. In Fig. 1 a scale of the platform type is indicated as having a platform 65 resting on supports 66 rigid with a supporting structure 67. A member 68 depends upon the structure 67 and cooperates with a lever 69 which carries counter weights 70. Obviously, these counterweights balance a portion of the load applied to the platform. The unbalanced portion of the load is transmitted by a member 30 depending upon the structure 67 to the system of levers represented in Fig. 14 as has been briefly described in connection with said figure.

Referring to Fig. 2 the weight chart is indicated at 55 and consists of two adjacent scales reversed with respect to each other and displaced 180 degrees with respect to each other so that one scale may be read on one side of the chart housing and the other scale on the other side with identical indications on both sides. The dash pot 72 is associated with the lever 52 to dampen the oscillations of the structure. A dash pot 73 is associated with the lever 58 to dampen the oscillations of this part of the structure. When the total price of an article being weighed is indicated in this manner it is often desirable to indicate the price per unit weight and this is provided for by the units charts 155 and 157 movable together and the tens charts 168 and 170 also movable together. These charts are arranged to indicate by their position the particular price per unit weight selected for the price computation and are operated as will hereinafter be described by the mechanism which effects pivotal connections of the several factor levers 40 and 47 with the price beam 44.

The mechanism for selectively associating the factor levers with price beam 44 will now be described with reference to Figs. 3, 4, 5, 9, 10 and 11.

Figure 3:
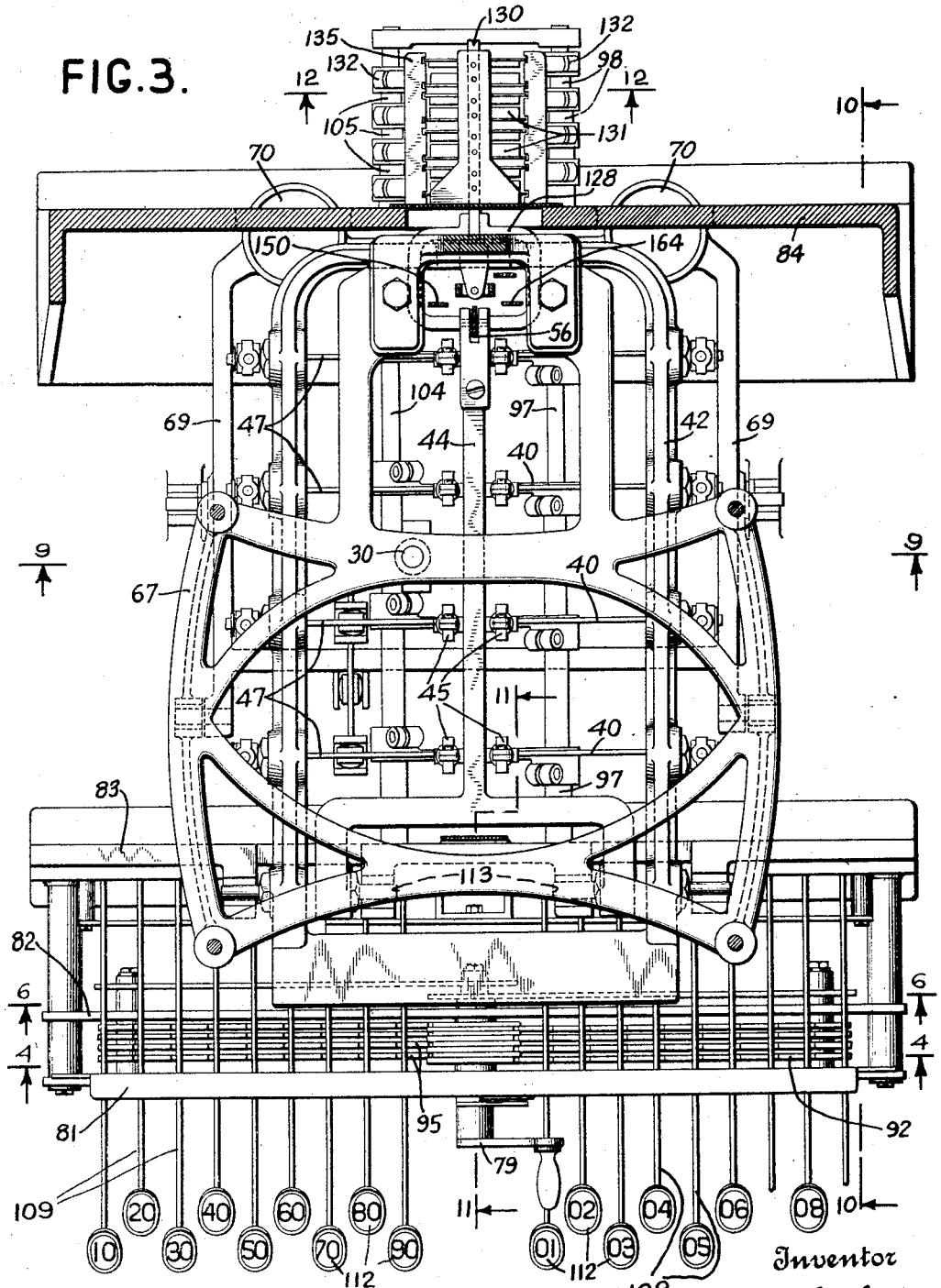
Fig. 3 is a section on line 3—3 of Fig. 1.

In front of the base housing 78 of the scale is a hand lever 79 for rocking a shaft 80 journaled in spaced vertical frame plates 81, 82, 83 and 84 (see Figs. 3 and 10). Fixed to shaft 80 between frame plates 81 and 82 is the hub 85 of a toothed segment 86 meshing with a toothed segment 87 on the lower end of a lever 88 also journaled between plates 81 and 82. The segment 87 in turn meshes with a segment 90 on a lever 91 similar to lever 88. The upper end of lever 88 is in cooperative engagement with four parallel bars 92 slidably guided on pins 93 and 94 fixed between standards or frame plates 81 and 82. The pins have grooves for guiding and spacing the bars. Similarly the upper end of lever 91 engages the sides of four bars 95 extending opposite to bars 92 and guided on grooved pins 93 and 96, the bars 95 and 94 alternating on pin 93.

Associated with bars 92 is a group of four nested rods or sleeves 97 and below the latter a set of four nested rods or sleeves 98. The rods are suitably, rotatably, supported by frames 81, 82, 83 and 84. Each bar 92 has a slot 100 shaped at the bottom to embrace an arm 101 depending from a sleeve 98 which terminates in said slot. Paired with each sleeve 98 through intermeshing teeth 102 is a corresponding sleeve 97 which terminates in the same slot. Thus, the first or outer sleeves 97 and 98 terminate in the slot 100 of the extreme right hand bar 92, as viewed in Fig. 11 and are in mesh with each other so that actuation of the lower sleeve 98 by the said bar will effect corresponding and similar movement of both outer sleeves. Similarly, the second or next to the outermost pair of sleeves 97 and 98 are meshed with each other and terminate in and are operatively connected with slots 100 of that bar 92 to the left of the extreme right hand bar, as viewed in Fig. 11, and so on with the third and innermost sleeves or rods 97 and 98.

In a similar manner, bars 95 are associated with nested sleeves or rods 104 and 105.

Figure 4:
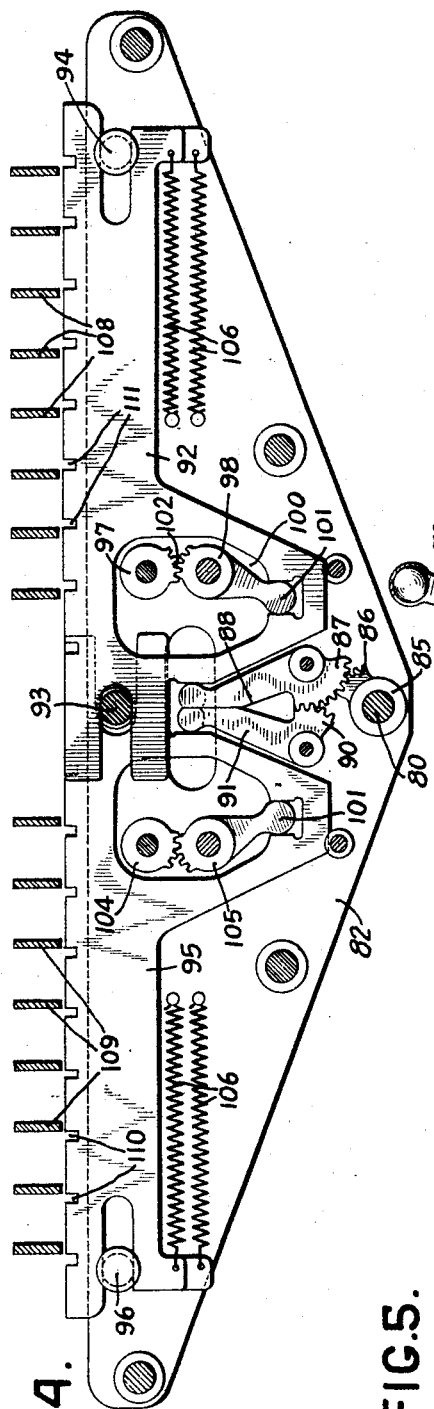
Fig. 4 is a section on line 4—4 of Fig. 3.
Figure 5:
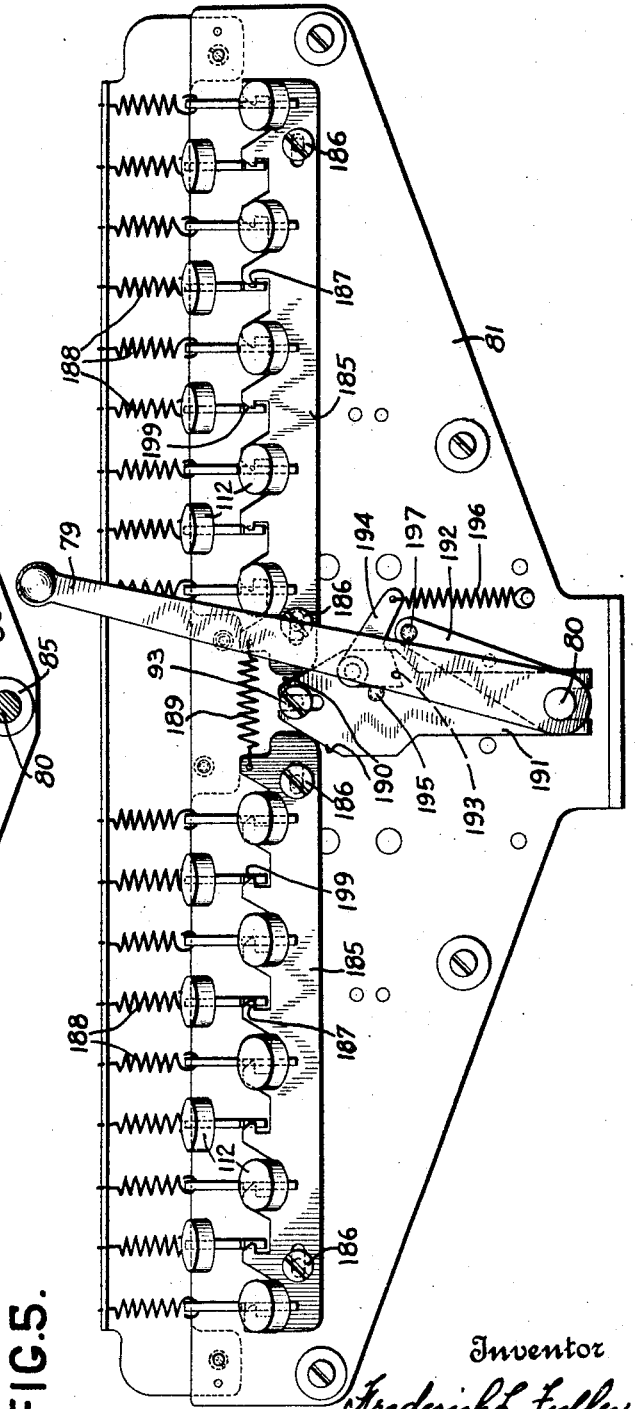
Fig. 5 is a view of the selecting key latching means.

If hand lever 79 is moved counterclockwise, as viewed in Figs. 4 and 5, the levers 88 and 91 rock away from each other and actuate all the bars 92 and 95 outwardly against springs 106, individually connected to the bars. When the lever 79 is released for return movement the springs 106 yieldingly urge the bars 92 and 95 to follow the levers 88 and 91 which return to initial position, shown in Fig. 4. Each bar 92, however, may be selectively locked against being returned by its spring 106 by any one of a set of nine combs comprising levers 108 while bars 95 may be locked by a set of nine comb levers 109. The upper edges of the bars 92 and 95 are formed with nine notches 110 and 111, respectively, each for receiving the lower edge of an associated comb lever. The combs of each set are differently cut out in the lower edge to give each comb of a set a different value. Thus as shown in Fig. 8, on a basis of an index value of one unit, the combs of a set have different index values 1 to 9. The meaning of this will now be made clear.

The comb levers extend through the front of the casing and the outer ends are provided with finger keys 112. The keys of levers 108 are marked with 01 to 09, representing 1 to 9 cents and will hereinafter be referred to as the units keys. The keys of levers 109 are marked with 10 to 90 representing 10 to 90 cents and will be referred to as the tens keys. If the key marked 90 is depressed, then the extreme right hand comb 109, as viewed in Fig. 4, is rocked on its pivot carried by standard 84, and seats only in the alined notch 110 of the first bar 95 from the right hand side, as viewed in Fig. 11. This bar may be termed 95—1 for identification. The notches in the other bars 95 will not be engaged by this comb because the latter is notched above the other three bars 95, as indicated in Fig. 8. Similarly, if the key marked 80 is depressed, the comb 109 rigid therewith is depressed and will engage only the notch in the second bar 95 from the right or 95—2, as indicated in Fig. 8. If comb 109 corresponding to 20 is depressed, all but the bar 95—2 will be engaged, and so on.

In a similar manner, depression of keys marked 01 to 09 respectively, effects locking by combs 108 of the bars 92—1, 92—2, 91—1 and 2, 92—3 and 1, etc., as indicated in Fig. 8.

When lever 79 is rocked clockwise to permit spring 106 to return the bars 92 and 95, only those bars not locked by the comb levers will return to initial position. The others will stay in the position to which they have been actuated by the counterclockwise movement of handle 79. As a result, the sleeves 97, 98, 104 and 105 connected to the locked bars 92 and 95 will also remain in actuated position and be unable to return.

Each of sleeves or rods 97 terminates at its forward end under a different one of the factor levers 40. Similarly, each sleeve or rod 104 terminates under a different factor lever 47. Thus the outer sleeve 97 terminates below the factor lever 40 nearest the knife edge pivot 113 of the price lever 44 (see Figs. 3 and 14), the next outer sleeve 97 terminates below the second lever 40 from the pivot of the price lever, and so on. Thus, each sleeve 97 is associated with a different factor lever 40 and each sleeve 104 is associated with a different factor lever 47.

At its terminus under an associated factor lever 40, the sleeve 97 has clamped thereto a collar 114 provided with an arm 115 carrying a lug 116 at the free end in which is a tapered cavity for receiving the pointed end of a pin-like extension 117 of the knife edge pivot-holding member 118. Similarly, sleeves 104 under their associated levers 47 have collars 119 provided with arms 120 for engaging pin-like extensions 121 of the knife edge pivot-carrying members 122 of the levers.

In their initial positions, indicated in full lines in Fig. 9, all the arms 115 and 120 are out of engagement with the pin extensions 117 and 121 of the factor levers. Consequently all the factor levers are initially connected to the price lever 44.

When at the beginning of an operation, the hand lever 79 is rocked counterclockwise (as viewed in Fig. 4) bars 92 and 95 move away from each other and through arms 101 of nested sleeves 98 and 105, respectively rock nested sleeves 97 and 104 upwardly in opposite directions. Arms 115 and 120 thereby respectively engage the pin extensions 117 and 121 and lift the factor levers 40 and 47 from the bearings 45 of the stirrup 46 suspended from the price beam. The position of a factor lever at the end of this operation is shown in dotted lines in Fig. 9.

After hand lever 79 has been rocked counterclockwise, as described, and the factor levers released from the price beam, the operator depresses either a units or a tens key or one of each. For example, if the article on the platform 65 of the scale costs 62 cents a pound, the units key marked 02 and the tens key marked 60 will be pressed down.

The tens key marked 60 and the units key marked 02 having been depressed, the sixth comb 109 from the left and the second comb 108 from the left, as viewed in Fig. 4, on which the said keys are respectively mounted move down towards the bars 95 and 92. Reference to Fig. 8 indicates that when the sixth comb 109 moves down, it enters a slot 110 in each of the bars 95—3 and 1 and locks these bars and that when the second lever 108 moves down, it enters a slot 111 in each of bars 92—4, 3, and 1 and locks these bars. After depressing these selected keys, the operator returns lever 79 and springs 106 tend to return all the bars 92 and 95. The bars 92—4, 3, and 1, being locked will not return and the sleeves 97 and 98 associated therewith will not be rocked back to initial position and the first, third and fourth factor levers 40 from the pivot 113 of the price lever will remain disengaged from the price lever, as indicated in dotted lines in Fig. 9. The bar 92—2 not being restrained, its spring 106 will return it to initial position and thereby sleeves 97 and 98 associated therewith will rock back to full line position indicated in Fig. 9 and the arm 115 of sleeve 97 will replace the second factor lever 40 on the pivot of the price beam. This is the only factor lever 40 now connected to the price beam and as previously explained in connection with Fig. 14, the second factor lever 40 connected to the price beam is effective in displacing the beam and the price chart 61 connected thereto the equivalent of two cents for a weight of one pound on the platform transmitted through member 30 to the factor levers.

Similarly, bars 95—3 and 1 being latched, the first and third factor levers 47 from the pivot of the price beam will be held out of contact with the price beam by the arms 120 of the associated sleeves 104. The second and fourth levers 47 will be replaced on the price beam and for each pound of weight on the platform will displace the beam and the price chart 61 the equivalent of sixty cents, as explained in connection with Fig. 14.

The aggregate of the forces on the price beam exerted by the factor levers 40 and 47 is thus equivalent to 62 cents for each pound. If the object on the platform weighs 4 pounds, the total displacement of the price beam will be equivalent to 4 times 62 or $2.48 which will be indicated on price chart 61. Similtaneously, the weight beam 42 will have been displaced and the weight chart 55 will indicate four pounds.

When a factor lever 40 is disengaged from the price beam 44, the loss of leverage due to the proportion of its dead weight carried by the price beam must be compensated for. For this purpose rigidly connected to the free end of the price beam through an open yoke 128 is an extension comprising an arm 130 for carrying weights 131. Each weight is adapted to compensate the dead weight of a different factor lever. When a factor lever is lifted from the price beam, the corresponding weight 131 is deposited on the extension 130 by means of one of sleeves 98 or 105.

Referring to Figs. 3, 10 and 12, the sleeves 98 and 105 terminate successively below the weights 131 on extension 130. At their ends sleeves 98 and 105 have collars 132 clamped thereto which are integral with arms 133 initially engaged with weights 131, as shown in dotted lines in Fig. 12. The weights 131 are thus initially free of the extension 130. When the hand lever 79 is actuated counter-clockwise all the sleeves 98 and 104 are rocked downwardly as already described in connection with the operation of sleeves 97 and 104. Weights 131 are thereby deposited on the extension 130.

After price keys 112 have been depressed return of hand lever 79 permits the free bars 92 and 95 to rock the associated sleeves 98 and 105 upwardly to initial position thus again releasing the corresponding weights 131 from the extension 130. Those sleeves 98 and 105 which correspond to the latched bars 92 and 95 will remain in the downwardly actuated position while the factor levers 40 and 47 of the same bars remain free of the price beam. Thus, the weights 131 act on the extension 130 of the price beam to compensate for the loss of dead weight of the released factor levers. The weights 131 are slidably guided and spaced by notched frame plates 135 and fixed pins 136.

In order to indicate the price per pound of the article being weighed, the following mechanism is employed:

Referring to Figs. 6, 10 and 11, in back of and parallel to bars 92 is a bar 140 similarly slidably guided on the pins 93 and 94. In back of and parallel to bars 95 is a bar 141 slidably guided on pins 93 and 96. When the hand lever 79 is rocked counterclockwise, integral rearward extending parts 142 and 143 of the upper ends of arms 88 and 91, respectively, move the bars 140 and 141 apart against the force of springs 106 in the same manner as bars 92 and 95 are moved apart by arms 88 and 91. The lower ends of bars 140 and 141 are provided respectively with rack teeth 144 and 145 in mesh with toothed segments 146 and 147 rotatably mounted on shaft 80.

When the bars 140 and 141 move apart, rods 144 and 145 rock the segments 146 and 147 in opposite directions. A bail 148 rotatably mounted on shaft 80 has the forward ear rigid with the side of segment 146 and the rear ear rigid with the side of a link 149 freely carried by shaft 80. The link 149 is pivoted to a link 150 forked at its upper end to embrace the sleeve 151. One side of the fork has a right angular extension 152 (Fig. 13) having a pin and slot connection 153 to the side of the web 154 of a chart 155. This chart is rotatable with and rigidly connected through a sleeve 156 to a similar diametrically opposite chart 157.

Charts 155 and 157 are each marked with numbers 0 to 9 and are controlled by the units price keys 112. When a units key marked 06 is depressed, the figure 6 on chart 155 will be displayed through window 158 of drum casing 159 and the figure 6 on chart 157 will be displayed through the opposite window 160 of the casing.

Similarly, to indicate the tens figure of the price per pound of the article, a bail 162 connects toothed segment 147 to a link 163 pivoted to the link 164 having its upper end forked to slidably embrace the sleeve 151. The angular extension 165 of the fork is connected at 166 to the side of the web 167 of the chart 168 which through shaft 169 is rigidly connected to the opposite chart 170. When a tens key 112 is depressed, one of the figures on chart 170 is visible through window 158 and the same figure on chart 168 is visible through window 160. Sleeves 156, 151 and shaft 169 are concentric and relatively rotatable.

If both a tens and a units key are depressed, the charts 170 and 155 will show the two denominational price per pound number in window 158 while charts 168 and 157 will show the same number in window 160.

The setting of the charts by the keys 112 is effected through combs 108 and 109. When any of the latter are depressed by the associated keys, as explained in describing the control of the factor levers, they move down into the path of one of the lugs 172 on the upper edge of bars 140 and 141. There are nine lugs on each bar, each differently spaced from its paired comb lever. Thus, blocking of the lugs by their paired combs will cause differential movements of the bars. After the bars 140 and 141 have been moved apart by the lever 79 simultaneously with the movement of factor lever control bars 92 and 95, the selected keys and connected comb levers are depressed and block associated lugs 175 on bars 140 and 141. When the lever 79 is released, springs 106 connected to the bars 140 and 141 tend to move them back to initial position, shown in Fig. 6, but the bars move only until blocked by the depressed comb levers.

During the latter movement, rack 144 rocks toothed segment 146 counterclockwise and through link 149 lowers link 150. Arm 152 at the upper end of the latter thereupon rocks charts 155 and 157 to the same extent. Thus, if the key marked 06 has been depressed, the bar 140 will on its return movement be stopped by engagement of the lug 172—6 with the comb 108—6 and segment 146, link 150 and charts 155 and 157 will have a corresponding return movement, the charts moving in the descending order to display the number 6 through the casing windows. Similarly, bar 141 will be stopped by a selected comb 109 after moving a distance corresponding to the depressed key and charts 170 and 168 will display the tens figure together with the units figure.

A shutter 175 is provided to mask the price per pound charts at the casing windows 158 and 160 until the price per pound keys 112 have effected positioning of these charts. To accomplish this, shutter 175 is freely pivoted on sleeve 156 (Fig. 13) and has one side of its web 176 pivotally connected to a link 177 which at its lower end is fast to a member 178 (see Figs. 2 and 7) slidably guided for vertical movement on a fixed pin 179 and on shaft 80. The member is provided with connected slots 180 and 181, the latter extending above the level of the slot 180. A lever 182 is fixed to shaft 80 and when the hand lever 79 is rocked at the beginning of an operation, shaft 80 shifts lever 182 from slot 181 to slot 180 in which it is releasably held by a spring strip 183. In passing from slot 181 to slot 180, the lever 182 raises member 178 and link 177 which through its connection to web 176 of the shutter rocks the latter counterclockwise, as viewed in Fig. 13, to obscure the charts at the reading windows. After this, the price keys 112 are depressed and the shaft 80 returned to initial position while the combs 108 and 109 differentially control the setting of the price per pound charts. Lever 182 thereupon returns to the slot 181 and permits member 178 to move downwardly and replace the shutter 175 in initial position to reveal the figures on the charts 155, 157, 168 and 170.

When a key is depressed, it is latched in depressed position by the following mechanism: Referring to Figs. 5 and 11, a pair of opposing latch bars 185 are slidably mounted on pins 186 extending in front of the frame plate 81. Each bar 185 has hooked lugs 187, each under a key 112. Initially, the keys are held above the hooks 187 by springs 188. The latch bars are urged towards each other by a spring 189 and separated by the beveled sides 190 of a member 191 slidably guided on pin or rod 93 and on shaft 80. When handle 79 is swung to the left, as viewed in Fig. 5, it moves an arm 192 fast to shaft 80 towards the bevel edge 193 of a dog 194 pivoted to member 191 and held against pin 195 on the member by a spring 196. Pin 197 on arm 192 cams the dog 194 and member 191 upwardly which spreads the latch bars apart. This disengages any of the keys from the associated hooks 187 which may have been hooked into the slots 198 (Figs. 10 and 11) of the keys during a previous operation. When the lever 79 completes its movement to the left, pin 197 passes the left end of the bevel 193 and permits the dog 194 and member 191 to drop the latch bars thereupon moving towards each other. Now if a key is depressed, it will first engage the bevel edge 199 of the associated hook of a latch bar and cam this latch bar against resistance of spring 189 in an outward direction. After passing the bevel edge 199, the hook 187 engages the slot 198 of the key and latches the latter. If another key of the same bank of keys is then depressed, it will first cam the bar outwardly, thus releasing the first latched key and then be latched itself. By this means, if the wrong key has been operated, depression of the correct key will release the wrong key.

After passing the left end of the bevel edge 193, the dropping of dog 194 will lock the arm 192 yieldingly against return movement. This will keep hand lever 79 in desired position for depressing keys 112. When the keys have been operated, the hand lever may be swung to the right moving dog 194 against resistance of spring 196, the dog following the movement of pin 192 until the latter passes the left end of the bevel 193 of the dog.

The operation of the machine will now be briefly summarized:

To find the weight and cost of an object, it is placed on a platform 65. The lever 79 at the front of the machine is then moved counterclockwise. This causes the sliding bars 92 and 95 to move apart and through nested sleeves 97 and 104 to rock arms 115 and 120 upwardly and release factor levers 40 and 47 from the price beam 44. At the same time bars 92 and 95 cause nested sleeves 98 and 105 through arms 133 to place all the weights 131 on the extension 130 of the beam 44. The bars 140 and 141 will also be spread apart by the ends 142 and 143 of arms 88 and 91 fast to shaft 80 operated by the leftward movement of hand lever 79. The price per pound indicating charts 155, 157, 168 and 170 will thereby be moved completely from 0 to past the 9 marks thereon through racks 144 and 145, segments 146 and 147 and the linkage connected thereto. The initial movement of lever 79 also moves the shutter 175 to masking position through lever 182, member 178, and link 177. Finally, the initial movement of lever 79 first spreads the latch bars 185 apart to release any keys 112 left latched by the previous weighing operation and then permits the bars to return to position for again latching any key 112.

The keys 112 are now ready to be operated. If the article costs 24 cents a pound the units key marked 04 and the tens key marked 20 are depressed and latched by the bars 185. The lever 79 is then rocked clockwise to return to initial position. During this movement of the lever, springs 106 return all the bars 92 and 95 except those bars 92 blocked by the comb bar 108 fast to key marked 04 and those bars 95 blocked by the comb bar 109 corresponding to key marked 20. The bars which return to initial position through sleeves 97 and 104, replace their connected factor levers on the price beam. The factor levers associated with the blocked bars 92 and 95 will remain free of the price beam. The other factor levers will be reset on the price beam. The weights 131 corresponding to released factor levers will remain on the extension 130.

While this is taking place, the depressed combs differentially position the bars 140 and 141 which through segments 146 and 147 move the price per pound indicating charts to aline the number "24" with the windows 158 and 160 of the casing. The shutter 175 in the meanwhile first masks these charts and is then returned to non-masking position by return of lever 182 to slot 181 of member 178, so that the number 24 will be visible through each window.

The price beam 44 will through tape 56 rock pendulum 57 which through lever 58 and link 59 causes rack and pinion 60 to move the total price dial 61 to indicate in windows 158 and 160 the total price at 24 cents a pound of the article. Through tape 50, pendulum 51, and connected linkage 52, 53 and 54, the weight beam 42 moves the weight chart 55 to display the weight of the article at windows 158 and 160.

While this is taking place, the bars 140 and 141 differentially position the price per pound indicating charts 155, 157, 168 and 170 to aline numbers "24" with the windows 158 and 160. The shutter 175 which masks these charts before the lever 79 is returned to initial position, unmasks them after the lever has completed its return movement.

Thus, the weight, price per pound, and total cost of an article will be simultaneously displayed in the windows.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

1. A scale comprising a beam, a load support connected thereto, load offsetting means, connecting devices for connecting said beam and said load offsetting means, rockable means for individually engaging and operating said devices to vary the connection of the beam to the load offsetting means, keys for determining the operation of said rockable means, and means for mechanically actuating said rockable means under control of the keys after operation of the latter, and while the latter are still in operated positions.

2. A scale comprising a beam, a load support connected thereto, load offsetting means, parallel factor levers spaced apart longitudinally of the beam for connecting said load offsetting means to different points of said beam, rockable members for engaging said devices, and selecting means for controlling said members at will.

3. A scale comprising a load support, load offsetting means, an indicator operated by the latter, connections between the load support and the indicator including mechanism whereby the ratio of movement between the load support and the load offsetting means and indicator may be varied, and means for controlling said mechanism including nested sleeves, and operating means for relatively moving said sleeves.

4. A scale comprising a load support, load offsetting means, connections between the support and said means including removable devices for varying the ratio of movement between the support and said means, nested sleeves, each having a member for operating one of said devices, and keys for selectively operating said sleeves.

5. A scale comprising a load support, load offsetting means, connections between the two including a series of factor levers, a plurality of rotatably mounted devices for controlling said levers, keys, and means operable independently of the keys subsequent to operation of the keys but under control of the latter for selectively controlling said devices.

6. A scale comprising a load support, load offsetting means, connections between the two including a series of factor levers, a plurality of rotatably mounted devices for controlling said levers, and keys for selectively controlling said devices, and means for actuating all of said devices before operation of any key to render the keys effective for exercising control of the devices.

7. A scale comprising a load support, load offsetting means, variable connections between the support and said means, devices for operating said connections, slidable bars for operating said devices, and combination combs for selectively controlling said bars.

8. A scale comprising a load support, load offsetting means, variable connections between the two, devices for operating said connections, a hand lever for preliminarily actuating said devices, selecting means for controlling said devices after such actuation, and means for rendering ineffective an operation of the selecting means before the lever has completed its preliminary actuation of said devices.

9. A scale comprising a load support, load offsetting means, variable connections between the two, devices for operating said connections, a hand lever movable in one direction for setting up said devices, selecting means for said devices after the latter have been set up, and means for releasably holding said hand lever at the end of its movement in said direction while the selecting means is operated.

10. A scale comprising a load support, load offsetting means, variable connections between the two, devices for operating said connections, means for positively operating said devices, selecting means for controlling said devices after a positive operation, and means for releasably operating said devices under control of said selecting means.

11. A scale comprising a load support, load offsetting means, a beam connecting the support and the load offsetting means, factor levers for engaging the beam to variably connect the support thereto, means for selectively removing the factor levers from the beam, compensating devices associated with the beam to compensate the dead weight loss of a different factor lever when the latter is removed from the beam, and rotatably mounted means for individually and selectively actuating said compensating devices upon actuation of the associated factor levers.

12. A scale comprising a weight support, weight offsetting means, variable connections between the two adapted to vary the operation of said offsetting means in accordance with different factors, means for selecting said factors, indicating means operated by said offsetting means for indicating the product of a selected factor by the weight on said support, indicating means for displaying the selected factor arranged in juxtaposition to said first-named indicating means, and differentially operable means movable independently of and into engagement with said factor selecting means for setting said factor indicating means to display the selected factor.

13. In combination, a pair of equilibrium machine devices, variable ratio means connecting the devices, selectors for selecting the ratio at which the ratio means is to be set, and means operated independently of the selectors for setting said ratio means under control of the latter according to the selected ratio.

14. In combination, a force sustaining device, a device operable under control of the first device, factor levers for inter-associating the two devices, means preliminarily operable to uniformly set the factor levers relative to the aforesaid devices, and means subsequently operable for selecting the ratio according to which the factor levers are to be reset, said first-mentioned means being then operable for resetting the factor levers under control of the selecting means according to the selected ratio.

15. In combination, a pair of equilibrium machine devices with variable ratio means inter-associating the two, selectors for selecting the ratio according to which the ratio means is to be set, and means actuated independently of the selectors into selective cooperation with the selectors while the latter are in selecting position for controlling the setting of said ratio means according to the selected ratio.

16. In combination, a pair of equilibrium machine devices with variable ratio means inter-associating the two, keys for selecting the setting of the ratio means, members cooperating with the depressed keys for controlling the setting of the ratio means according to the selected ratio, and an operating device for actuating said members.

17. In combination, a pair of equilibrium machine devices with factor levers inter-associating the two, selectively settable stops for determining the ratio according to which the factor levers are to be set, and means individually associated with the factor levers coating with said stops for setting the factor levers according to the selected ratio.

18. In combination, a pair of equilibrium machine devices with variable ratio means inter-associating the two, rockable toothed means for controlling the ratio means, selectors operable for selecting the ratio according to which the ratio means is to be set, and means for operating said toothed means under control of the selectors.

19. In combination, a pair of equilibrium machine members with a plurality of different denominational order variable ratio devices inter-associating the members, selectors for selecting the ratio according to which each of said ratio devices is to be set, an actuator, and connections between the actuator and each denominational order ratio device commonly operated by the actuator for setting the ratio devices under control of the selectors.

20. In an equilibrium machine, a load support, a plurality of slidable members, common guides for said members, stops for restraining operation of said members selectively, and indicating means variably associated by said members with said load support.

21. In combination, a pair of equilibrium machine devices, factoring means inter-associating said devices, an indicator for indicating a selected factor, means for controlling the setting of said factoring means including selectors and coacting combs, and means for controlling the setting of the indicator including aforesaid selectors and different coacting combs.

22. In combination, a pair of equilibrium machine devices, factoring means inter-associating said devices, combs for controlling the factoring means, selectors for controlling the combs, and means for actuating the combs including a rockable toothed member engaging the comb, a toothed element meshing with the toothed member, and means rigid with the toothed element for operating the latter.

23. In combination, a force sustaining device, a device operable under control of the first device, factor levers for variably associating said devices with each other, rockable shafts, arms laterally extending from the shafts below the factor levers for engaging the levers, and means for rocking said shafts to effect actuation of the levers by the arms.

24. In an equilibrium machine, a pair of equilibrium devices, means for variably inter-associating said devices, members for controlling said means, selector keys cooperating with a combination of said members for determining operation of the latter, an operating shaft, and means thereon for operating said members.

25. In combination, a pair of equilibrium machine members, variable ratio devices inter-associating the members, selectors for selecting the ratio at which the ratio devices are to be set, means cooperating with the selectors for effecting the setting of the ratio devices according to the selected ratio, an operating shaft, and mechanism operated by said shaft for actuating aforesaid means.

26. In combination, a load platform, a counterbalance, factor levers settable to variably connect the load platform to the counterbalance, selectors for determining the setting of the factor levers, and an operating mechanism for effecting a setting of the levers subsequent to operation of the selectors and under control of the latter.

27. In combination, a load platform, a counterbalance, factor levers variably associating the load platform to the counterbalance, selectors operable to determine the setting of said levers, a handle, and operating controls between the handle and levers for effecting a setting of the levers under control of said selectors.

28. In combination, a load platform, a counterbalance, factor levers for providing various multiplications between the load platform and the counterbalance, an operating shaft, operating controls between the shaft and levers, the shaft being movable to cause a plurality of the factor levers to be dissociated by the operating controls from the counterbalance, and selectors operable to selectively control the return of some of the levers into association with the counterbalance in accordance with the multiplication desired between the platform and counterbalance.

29. In combination, a load platform, a counterbalance, factor levers for providing various multiplications between the platform and counterbalance, a reciprocatable handle, operating connections between the handle and levers, operation of the handle in one direction uniformly setting the levers through said connections with respect to the counterbalance and platform, and selectors for controlling said connections upon movement of the handle in the other direction to effect a variable setting of the levers with respect to the platform and counterbalance to provide a desired multiplication therebetween.

In testimony whereof I hereto affix my signature.

FREDERICK L. FULLER.